United States Patent
Ota et al.

(10) Patent No.: US 9,045,634 B2
(45) Date of Patent: Jun. 2, 2015

(54) THERMOPLASTIC POLYESTER RESIN COMPOSITION

(71) Applicant: Toray Resin Company, Shelbyville, IN (US)

(72) Inventors: Kenji Ota, Shelbyville, IN (US); Dennis Godwin, Shelbyville, IN (US); Yasuo Maeda, Shelbyville, IN (US)

(73) Assignee: TORAY RESIN COMPANY, Shelbyville, IN (US)

( * ) Notice: Subject to any disclaimer, the term of this patent is extended or adjusted under 35 U.S.C. 154(b) by 147 days.

(21) Appl. No.: 13/853,602

(22) Filed: Mar. 29, 2013

(65) Prior Publication Data

US 2014/0296403 A1 Oct. 2, 2014

(51) Int. Cl.
*C08L 31/06* (2006.01)
*C08L 67/02* (2006.01)

(52) U.S. Cl.
CPC .................... *C08L 67/02* (2013.01)

(58) Field of Classification Search
CPC ........ C08L 31/06; C08L 67/02; C08K 5/0041; C08K 7/14
USPC .................... 524/159, 186, 190, 494
See application file for complete search history.

(56) References Cited

U.S. PATENT DOCUMENTS 4,369,280 A * 1/1983 Dieck et al. ................... 524/281

* cited by examiner

*Primary Examiner* — Kriellion Sanders
(74) *Attorney, Agent, or Firm* — Birch, Stewart, Kolasch & Birch, LLP

(57) ABSTRACT

A colorless thermoplastic polyester resin composition that can form a molded article with good appearance is provided. More specifically, a thermoplastic polyester resin composition is provided, which has (A) polybutylene terephthalate resin, (B) polyethylene terephthlatae resin, (C) nigrosine dye, and (D) glass fibers. The blending amounts are (A) in the range of 55-86 wt. % and (B) in the range of 14-45 wt. % based on 100 wt. % of a total of (A) and (B). Further, (C) is in the range of 0.1-1.5 parts by weight based on 100 parts of a total of (A) and (B). Preferably, the carboxy terminal groups of (A) is at 25 (eq/t), the intrinsic viscosity of (A) is in the range of 0.60-0.90, and the melting point of (C) is less than 300° C.

11 Claims, No Drawings

THERMOPLASTIC POLYESTER RESIN COMPOSITION

FIELD OF THE INVENTION

The present invention is related to a thermoplastic resin composition that can form molded articles with excellent appearance. This thermoplastic resin composition is used for electrical/electronic equipments, automobile parts, and machine parts, and molded articles that are formed from this thermoplastic composition.

DESCRIPTION OF RELATED ART

Because thermoplastic polyester resins have superior mechanical properties, heat resistance, and moldability, these resins are widely used in automobile parts, films, and electrical/electronic parts. Among these resins, a polybutylene terephthalate resin or polyethylene terephthalate resin (which is one kind of polyester resin has a reinforcing effect due to inorganic reinforcing material and because of excellent chemical resistance) are widely used as materials for industrial molded articles such as connectors, relays, or switches in automobiles or an electrical/electronic apparatus.

Coloring for thermoplastic polyester resins has the goal of protecting a product contained in a contact and blocking light, as well as decorative and color separation effects, in addition to improved light resistance of the molded articles. Black color is the most important of colors in the industrial world. Conventionally, black coloring of thermoplastic polyester resins has been tried using inorganic pigments, such as carbon black.

Patent Citation 1 references black resin compositions comprised of polybutylene terephthalate, polyethylene terephthalate, and carbon black, but because the crystallization speed is high and mold transferability is insufficient, when performing reinforcement by mixing with inorganic reinforcement materials, the molded articles's appearance and its glaze are insufficient.

Patent Citation 1: Japanese Patent Application Laid-Open No. 2012-57152

SUMMARY OF THE INVENTION

The present invention has achieved good mechanical properties, with reinforcement through mixing with inorganic reinforcing materials so as to produce a composition that can form molded articles with sufficient surface appearance and a composition that can be appropriately used with automobiles or an electrical/electronic apparatus. This invention also provides a thermoplastic polyester resin composition and its molded product thereof.

The inventors, in order to solve such problems discovered, through diligent research, by using a resin composition combining specific polybutylene terephthalates, polyethylene terephthalates and specific nigrosine staining, a remarkable improvement in molded articles' appearance has been obtained.

That is, the present invention is:

(1) a thermoplastic polyester resin composition containing (A) polybutylene terephthalate resin, (B) polyethylene terephthalate resin, (C) nigrosine dye, and (D) glass fibers with blending amounts of (A) in the range of 55-86 wt. % and (B) in the range of 14-45 wt. % based on 100 wt. % of a total of (A) and (B), and (C) in the range of 0.1-1.5 parts by weight based on 100 parts of a total of (A) and (B), the carboxy terminal groups of (A) at 25 (eq/t), the intrinsic viscosity of (A) in the range of 0.60-0.90, and the melting point of (C) less than 300° C.; and (2) a mold or molded product that consists of the thermoplastic polyester resin composition in (1).

DETAILED DESCRIPTION OF THE INVENTION

According to the Invention, it is possible to provide a thermoplastic polyester resin composition and molded articles comprising this resin that has superior mechanical properties, with reinforcement by blending with inorganic reinforcement materials and that has a sufficient surface appearance.

The (A) polybutylene terephthalate resin that is used in the present invention is a polymer that can be obtained by normal polymerization methods such as polyesterification reactions with a principal component such as terephthalic acid or its ester forming derivative and 1,4-butanediol and its ester forming derivative, and it is appropriate to include other copolymers in a range that does not adversely affect the properties, say, in an amount of 20 weight parts or less based on 100 parts of the principal component. Furthermore, as an example of these polymers and copolymers, the following can be cited as used independently or in combination: polybutylene terephthalate, polybutylene (terephthalate/isophthalate), polybutylene (terephthalate/adipate), polybutylene (terephthalate/sebacate), polybutylene (terephthalate/decanedicarboxylate), polybutylene (terephthalate/naphthalate, or poly(butylene/ethylene) terephthalate.

The (A) polybutylene terephthalate resin that is used in the present invention has a intrinsic viscosity in the range of 0.60-0.90 with a o-chlorophenyl solution at 25° C., preferably in the range of 0.60-0.80, and more preferably in the range of 0.6-0.70. Mechanical properties are not good if the intrinsic viscosity is less than 0.60, and when the intrinsic viscosity exceeds 0.90, the flowability suffers and the appearance of molded articles deteriorates.

The carboxyl terminal groups of the polybutylene terephthalate resin that are used in the present invention are 25 eq/t, and preferably 15-25 eq/t. The carboxyl terminal groups dissolve in an organic solution polybutylene terephthalate by using alkali hydroxide solution, through titration. When the carboxyl terminal groups of the polybutylene terephthalate exceed 25 eq/t, ester exchange between the polybutylene terephthalate and the polyethylene terephthalate progresses, and there is a tendency for the mechanical properties and appearance to deteriorate.

The manufacturing method for the (A) polybutylene terephthalate resin that is used in the present invention is not especially restricted, and it is possible to manufacture it by well-known polycondensation methods or by ring-opening polymerization methods with batch polymerization or continuous polymerization; and in addition, any reaction may be used to perform ester exchange and direct polymerization. Moreover, in order to effectively advance esterification or ester exchange reaction and polycondensation reactions, it is desirable to add polymerization reaction catalysts during these reactions. As concrete examples of polymerization reaction catalysts, the following can be cited: methyl ester of titanic acid, tetra-n-propyl ester, tetra-n-butyl ester, tetra isopropyl ester, tetra isobutyl ester, tetra-tert-butyl ester, cyclohexyl ester, phenyl ester, benzyl ester, tolyl ester or organic titanium compounds of these mixed esters, tin compounds such as dibutyl tin oxide, methylphenyl tin oxide, tetraethyl tin, hexaethyl tin oxide, cyclohexahexyl ditinoxide, dodecyl tin oxide, triethyl tin hydroxide, triphenyl tin hydroxide, triisobutyl tin acetate, dibutyl tin diacetate, diphenyl tin dilaurate, monobutyl tin trichloride, dibutyl tin dichloride, tributyl tin chloride, dibutyl tin sulphate and butyl hydroxyl tin oxide, methyl stannylate, ethyl stannylate, butyl stannylate, zirconia compounds such as zirconium tetra-n-butoxide, and antimony compounds such as antimony trioxide and antimony acetate, but organic titanium compounds and tin compounds among the listed compounds are preferable. Furthermore, the following compounds are more preferable: tetra-n-propyl ester of titanic acid, tetra-n-butyl ester and tetra isopropyl ester, and tetra-n-butyl ester of titanic acid is especially preferable. These polymerization reaction catalysts may be used independently or in combination. The additive amount of the polymerization reaction catalysts, from the point of view of mechanical properties, moldability, and coloring is preferably, using the polybutylterephthalate resin as 100 parts by weight, in the range of 0.005-0.5 parts by weight, or more preferable, in the range of 0.01-0.2 parts by weight.

The (B) polyethylene terephthalate resin that is used in the present invention is polycondensed using terephthalic acid for the acid component and ethylene glycol for the glycol component, aiming for a thermoplastic polyester resin of high molecular weight with ester bonds in the main chain. In addition, for the acid component, isophthalic acid, adipic acid, and oxalic acid may be used. For the glycol component, the following may be used: propylene glycol, 1,4-butanediol, neopentyl glycol, 1,5-pentanediol, 1,6-hexanediol, decamethylene glycol, cyclohexanedimethanol, cyclohexanediol or long chain glycol of molecular weight in the range of 400-600, that is, polyethylene glycol, poly-1,3-propylene glycol, and polytetra methylene glycol as copolymer of 20 mols % or less. In addition, the impact strength and moldability of the compositions that can be obtained when the intrinsic viscosity, measured at 25° C. using an o-chlorophenyl solution, is in a range of 0.36-1.60; especially, a range of 0.45-1.15 is appropriate for the polyethylene terephthalate resin.

In addition, it is necessary that the blending amount of the thermoplastic polyester resin that forms the present invention, assuming the total of (A) polybutylene terephthalate resin and (B) polyethylene terephthalate resin to be 100% by weight, is 55-86 wt. % for (A) and 14-45 wt. % for (B). A preferable range for (A) is 61-76 wt. % and for (B) 24-39 wt. %. Here, the appearance suffers if the blending amount for (A) is less than 55 wt. % or more than 85 wt. %.

The nigrosine stain used in the present invention has a melting point of less than 300° C. as with Solvent Black. When using a nigrosine stain with a melting point of less than 300° C. by finely dispersing the stain within the resin, the compatibility of the polybutylene terephthalate and polyethylene terephthalate improves and the appearance improves.

In addition, the blending amount of (C) is in the range, with respect to 100 parts by weight of a total of (A) and (B), 0.1-1.5 parts by weight, and preferably in the range of 0.4-1.2 parts by weight. With a lot of (C), significant amounts of gas are released and the molded products appearance suffers. When the amount of (C) is small, the crystallization rate is high, mold transferability declines, the appearance of the mold significantly suffers.

The thermoplastic polyester resin of the present invention preferably contains glass fibers (D), and it is possible to improve the mechanical properties of the resin composition. Glass fibers of chopped strand type or roving type can be cited. Glass fibers are preferable those that are processed by collecting agents that contain silane coupling agents such as amino silane compounds and epoxy silane compounds, and/or urethane or vinyl acetate, bis-phenyl A diglycidylether, or one or more kinds of epoxy compound such as novolak epoxy. Silane coupling agents and/or collecting agents may be used with emulsion liquids. Combinations of these compounds may be used.

There are no special restrictions to the average fiber diameter for the glass fibers (D), but diameters in the range of 1-100 μm are preferable and those in the range of 5-20 μm are more preferable. The average fiber length of the glass fibers (D) has no special restrictions, but those in a range of 0.1-20 mm are preferable, and those in the range of 1-10 mm are more preferable.

Fiber reinforcing material having arbitrary cross-sections such as circular glass fibers, cylindrical glass fibers of arbitrary vertical/horizontal ratios, flat glass fibers, and circular-shaped glass fibers may be used for the glass fibers (D) in the present invention. The glass fibers (D) improve flowability of the thermoplastic resin composition during injection molding, and then molds with little warping can be obtained.

In addition, the blending amount of (D), with respect to the total of (A)+(B) represented as 100 parts by weight, is preferably in the range of 5-85 parts by weight, more preferably in the range of 20-70 parts by weight, and especially preferable in the range of 35-50 parts by weight. Because the glass fibers will easily float on the molded product surface if there is a significant amount of (D), the molded appearance may suffer. If there is not enough of (C), the product's strength may be remarkably reduced.

It is possible to add to the polyester resin composition of the present invention, in a range that does not detract from the effect of the invention, normal additives and small amounts of other kinds of polymers such as resin components, elastomer components, flame retardants, mold release agents, phosphorus antioxidizing agents, stabilizers, ultraviolet ray absorbing agents, colorants, and lubricants. The resin component may be any soluble and moldable resin, for example, polycarbonate resin, polybutylene naphthalene dicarboxylate resin, polyethylene naphthalene carboxylate resin, polypropylene terephthalate resin, ABS resin (acrylonitrile/butadiene/styrene copolymer), AS resin (acrylonitrile/styrene copolymer), hydrogenated or non-hydrogenated SBS resin (styrene/butadiene/styrene triblock copolymer) and hydrogenated or non-hydrogenated SIS resin (styrene/isoprene/styrene triblock copolymer), SEBS resin (hydrogenated styrene/butadiene/styrene triblock copolymer), polyethylene resin, polypropylene resin, polymethylpentene, ring olefin resin, cellulose resins such as cellulose acetate, polyamide resin, poly acetyl resin, polysulfone resin, polyphenylenesulfide resin, polyether ether ketone, polyimide resin, or poly ether imide resin. The resins for blending do not have to be of one kind, but two or more may be used in combination.

It is possible to blend the elastomer component, with the goal of improving the characteristic toughness, such as impact strength, with an ethylene (co) polymer or core shell rubber. High density polyethylene, low density polyethylene, and ultra low density polyethylene can be cited as examples of ethylene polymers and/or ethylene copolymers. The ethylene copolymer can be obtained by copolymerizing ethylene and by copolymerizing a monomer with ethylene. Examples of copolymerizable monomers are propylene, butene-1, vinyl acetate, isoprene, butadiene, or monocarboxylic acid such as acrylic acid or methacrylate, or dicarboxylic acids such as these ester acids, maleic acid or itaconic acid. It is possible for the ethylene copolymer to be manufactured by usual well-known methods. As examples of ethylene copolymers, the following can be cited: ethylene/propylene, ethylene/butene-1, ethylene/vinyl acetate, ethylene/ethylene acrylate, ethylene/methyl acrylate and ethylene/methacrylate ethylene acrylate. In addition, it is preferable to use acid anhydrides or glycidyl methacrylates for the ethylene (co) polymers. These may be used independently or in combinations of two or more, and it is permissible to mix one kind or more of the ethylene (co) polymers. In addition, even among the ethylene (co) polymers, it is preferable to use for the polyethylene, acid anhydrides or glycidyl methacrylates so that the graft or polymerized copolymer is compatible with PBT.

In addition, the core shell rubber is a multilayer constructed polymer comprised of a rubber component in the core layer and a thermoplastic resin component in the shell layer for the extreme outside layer. For example, the core layer can be a dimethyl siloxane/butyl acrylate polymer and the outermost layer is a methyl methacrylate polymer. Or, the core layer can be a butyl acrylate polymer and the outermost layer is a methyl methacrylate polymer. Furthermore, polymers may be used that contain glycidyl methacrylate in just the core layer or outermost layer or in both layers.

There are no special restrictions on flame retardants if the substance to be added has the goal of imparting flame retardant capability to the resin. Concretely, it is possible to use bromide flame retardants, phosphorus flame retardants, nitrogen compound flame retardants, silicon flame retardants, or inorganic flame retardants. Each one can be used individually or in a mixture, with a mixture of bromine flame retardant and inorganic flame-retardants cited as preferable.

The following can be used as concrete examples of bromine flame retardants that are used with the present invention: tetra bromine bis phenyl A derivatives, tetra bromine bis phenyl A derivatives, bromide epoxy resins such as tetra bromine bis phenyl A epoxy oligomer or polymer, tetra brome bis phenyl A-carbonate oligomer or polymer, bromine phenyl novolak epoxy, or polymer (pentabromobenzyl polyacrylate) pentabromobenzyl polyacrylate, or N,N'-ethylene bis tetrabromo phthalimide. Even among these compounds, tetrabromine bis phenyl A-epoxy oligomer or polymer or tetra bromine bis phenyl A-carbonate oligomer or polymer is preferable.

It is possible to use as an inorganic flame retardant that is used with the present invention the following: magnesium hydroxide hydrate, aluminum hydroxide hydrate, antinomy trioxide, antimony pentoxide, sodium antimonite, hydroxy zinc stannate, zinc stannate, metastannic acid, tin oxide, or zinc borate. Among these compounds, antimony trioxide is preferable.

The following can be used as a mold release agent: plant system waxes such as carnauba wax, rice wax, animal waxes such as bees wax or lanolin wax, mineral wax such as montan wax, oil-based waxes such as paraffin wax or polyethylene wax, fat based waxes such as ricinus and its derivatives, or aliphatic acid and its derivatives.

The following can be cited as phosphorus based antioxidants: trisnonylphenyl phosphite or distearylpentaerythritol.

The following can be cited as stabilizers: a benzotriazole based compound that contains 2-(2'-hydroxy-5'methylphenyl)benzotriazole, a benzo based compound as with 2,4-dihydroxybenzophenone, ester phosphates such as mono or distearyl phosphate or trimethylphosphate.

Because each kind of these additives can be used to give a compatible effect through combination of two or more kinds, a combined use is permissible.

Moreover, some oxidizing prevention agents may be used as a stabilizer or ultraviolet ray absorbing agent. In addition, some stabilizers may be used for oxidizing prevention or ultraviolet ray absorption. That is, the previously described classification is one of convenience and does not restrict an additive's use.

As an ultraviolet ray absorbing agent, it is possible to cite the following: a benzophenone based ultraviolet absorption agent represented by, for example, 2-hydroxy-4-n-dodecyloxybenzophenone, 2,2-hydroxy-4,4'-dimethoxybenzophenone, or bis(5-benzoyl-4-hydroxy-2-methoxyphenyl)methylene. In addition, a benzotriazole based ultraviolet ray absorbing agent is represented by the condensate of 2-(2'hydroxy-5'-methylphenyl)benzotriazole, 2-(2'-hydroxy-3',5'-di-tert-amyl phenyl)benzotriazole, 2-(2-hydroxy-3',5'-bis(α, α-dimethylbenzyl)phenylbenzotriazole, 2,2'methylene bis [4-(1,1,3,4-tetramethylbutyl)-6-(2H-benzotriazole-2-il) phenol], and methyl-3-[3-tert-butyl-5-(2H-benzotriazole-2-il)-4-hydroxyphenylproprionate-polyethylene glycol.

In addition, it is possible to include light stabilizing agents that are hindered amine based as represented by bis(2,2,6,6-tetramethyl-4-piperidyl sebacate, bis(1,2,2,6,6-pentamethyl-4-piperidyl sebacate, tetrakis(2,2,6,6-tetramethyl-4-piperidyl)-1,2,3,4-butanetetracarboxylate, poly([6-(1,1,3,3-tetramethylbutyl)amino-1,3,5-triazine-2,4-diol][(2,2,6,6-teramethylpiperidyl)amino]hexamethylene[(2,2,6,6-tetramethylpiperidyl)amino]}, and polymethylpropyl 3-oxy-[4-(2,2,6,6-tetramethyl)piperidinyl]siloxane. Such light stabilizing agents, in combined use with ultraviolet ray absorbing agents or every kind of oxidizing prevention agent, exhibit good characteristics such as weather resistance.

The coloring agent has been, for example, an organic dye, an organic pigment, or inorganic pigment. In addition, it is possible to use fluorescent brighteners, light collecting pigments, fluorescent dyes, flow enhancers, inorganic and organic antibacterial agents, photocatalytic based stain proofing agents, infrared ray absorbing agents, or photochromics agents.

It is desirable that these blending components be uniformly dispersed for the thermoplastic resin composition of the present invention, and the blending method can use any arbitrary method. As a representative example, it is possible to cite methods that melt and knead at temperatures in the range of 200-350° C. using well-known melting kneaders such as uniaxial or biaxial extruders, Bambari mixers, kneaders, or mixing rolls. Every component is lump premixed and may be melted and mixed from the mixed lump. Moreover, it is preferable that little moisture be present in each component and it is desirable that the components be pre-dried. It is not necessary that all of the components be dried.

In addition, full flight and kneading disk are combined as a screw structure when using a biaxial extruder with the present invention, and it is necessary to uniformly mix the composition of the present invention by screw. Because of this necessity, it is desirable that the proportion of the total length of the kneading disk (kneading zone) with respect to the screw's total length be in a preferable range of 5-50% or in an even more preferable range of 10-40%.

When melting and mixing for the present invention, a desirable method for injecting each component uses an extruder that has two injection inlets. From the principal injection inlet positioned on the screw base side, the (A) polybutylene terephthalate resin, the (B) polyethylene terephthalate resin, and the (C) nigrosine based pigment are supplied. From the secondary injection inlet positioned between the principal injection inlet and the extruder tip, the (D) glass fibers are supplied.

It is possible that the resin composition of the present invention be formed by other methods such as the usual well-known injection molding, extrusion molding, blow molding, press molding, or spinning, and it is possible to process and use for every kind of molding. It is possible to use for molding, injection molding, extrusion molding, blow molding, film, sheet, or thread. Every kind of film such as unstretched, uniaxially stretched, or biaxially stretched may be used. Every kind of fiber may be used such as unstretched fiber, stretched fiber, or ultra stretched fiber. When forming by using a die (a mold), it is desirable that the die's temperature be in the range of 40-120° C., preferably in the range of 60-95° C. When the die's temperature is low, the appearance of the molded articles is remarkably reduced. When the die's temperature is high, it is difficult to separate the molded article from the die and formability remarkably suffers.

With the present invention, every kind of molded articles may be used in every kind of intended purpose such as in automobile parts, electrical/electronic parts, construction materials, every kind of container, everyday items, household goods and sanitary articles.

The present invention's concrete uses are as follows: among automotive underhood parts such as air flow meter, air pump, thermostat housing, engine mount, ignition bobbin, ignition case, clutch bobbin, sensor housing, idle speed control bulb, vacuum switching bulb, ECU housing, vacuum pump case, inhibitor switch, rotary sensor, speed sensor, distributor cap, coil base, ABS actuator case, top and bottom of radiator tank, cleaning fan, fan shroud, engine cover, cylinder head cap, oil cap, oil pin, oil filter, fuel cap, fuel strainer, distributor cap, vapor canister housing, air cleaner housing, timing belt cover, brake booster part, every kind of case, every kind of tube, every kind of tank, every kind of hose, every kind of clip, every kind of bulb, and every kind of pipe; among automotive interior parts, torque control lever, safety belt part, register blade, wash lever, window regulator handle, window regulator handle knob, passing light lever, sun visor bracket, and every kind of motor housing; among automotive exterior parts such as roof rail, fender, garnish, bumper, door mirror stay, spoiler, food bar, wheel cover, wheel cap, grill apron cover frame, light reflector, light bezel, and door handle; and connector for every kind of automobile such as wire harness connector, SMJ connector, PCB connector, and door grommet connector; electrical/electronic parts represented by electrical connectors, relay case, coil bobbin, light pick up chassis, motor case, notebook personal computer housing and internal parts, CRT display housing and internal parts, printer housing and internal parts, portable telephones, mobile personal computers, hand held type mobile portable terminal housing and internal parts, housing and internal parts for recording media (CD, DVD, PD, FDD, etc.) drives, housing and internal parts for copy machines, housing and internal parts for facsimile, or parabolic antenna. Furthermore, it is possible to cite household/office electrical manufactured parts represented by moving image apparatus parts such as VTR parts, TV parts, iron, hair dryer, rice steamer parts, electronic range parts, audio parts, video camera, or projector; optical recording media base of laser disks (registered trademark), compact disk (CD), CD-ROM, CD-R, CD-RW, DVD-ROM, DVD-R, DVD-RW, DVD-RAM, or blu-ray disk; household/office electrical manufactured parts represented by illumination parts, refrigerator parts, air conditioner parts, typewriter parts or word processor parts. In addition, there can be cited the housing and internal parts for electronic instruments, game machines for the household or portable type game machines, or electrical/electronic parts such as every kind of gear, every kind of case, sensor, LEP lamp, connector, socket, resistor, relay case, switch, coil bobbin, condenser, variable condenser, optical pickup, crystal oscillator, every kind of terminal board, converter, plug, print line board, tuner, speaker, microphone, headphone, small monitor, magnetic head base, power module, semiconductor, liquid crystal, FDD carriage, FDD chassis, motor brush holder, transformer member, coil bobbin as examples of electrical/electronic parts; construction members such as a sash door, blind curtain parts, pipe joint, curtain liner, blind part, gas meter, flow meter, boiler, roof panel, insulated wall, adjuster, plywood bundle, ceiling hoisting attachment, stairs, door, floor; aquatic related materials as in fishing line, fishing nets, seaweed cultivation nets, fishing crop; civil engineering related members such as vegetation nets, vegetation mats, grass protection bag, grass protection net, curing sheet, slope maintenance sheet, flyashes push sheets, drain sheet, water holding sheet, sludge/slime drain, concrete type rod; mechanical parts such as a gear, screw, spring, bearing, lever, key stem, cam, ratchet, roller, water supply, toy, fan, synthetic fuber thread, pipe, washboard, motor, microscope, binoculars, camera, clock; agricultural members such as mulch film, tunnel film, bird protection sheet, cultivation maintenance non-woven sheet, propagation pot, vegetation stake, string tape, germination sheet, house lining sheet, overturning tool, delayed release fertilizer, biobarrier, garden net, insect barrier sheet, young tree net, print laminate, fertilizer bag, specimen bag, sandbag, bird and animal damage prevention net, trigger cord, wind prevention net; sanitary products such as disposable diapers, menstruation packages, cotton applicator, wet wipes, or toilet seat cover; medical products such as medical non-woven sheet (suture reinforcement material, adhesion prevention film, artificial tube repair material), wound cloth material, scratch tape bandage, paste-on sheet, surgical sutures, fracture reinforcement material, medical film, wrapping for calendar, writing tool, clothing material, food products; containers/dinnerware such as trays, blister, knife, fork, spoon, tube, plastic can, pouch, container, tank, or basket; container/packaging such as hot feel containers, containers for electronic range food preparation, lamps, foam buffering agent, laminated sheets, shampoo holder, food bottle, cap, candy wrap, shrink wrap, cover material, window sealing, fruit basket, wreath tape, easy peel packaging, egg pack, HDD packaging, compost bag, recording media packaging, shopping bag, or wrapping film for electrical/electronic parts; every kind of clothing such as natural thread composite, polo shirt, T-shirt, inner, uniform, sweater, sock, or necktie; products used for the interior such as curtains, chair attachment area, carpet, tablecloth, bed cover, wallpaper, wrapping cloth; convenient items such as carrier tape, print laminate, film for thermosensitive porous plate printing, separation film, porous film, container bag, credit card, cash card, ID card, IC card, paper, hide and hot melt binder such as for non-woven sheets, magnetic material, zinc sulfide, electrode material powder binder, optical element, conductive emboss tape, IC tray, golf tee, rubber bag, every kind of net, gear flange, stationery, slotted filter net, body towel, hand towel, tea pack, drain filter, clear file, coating agent, adhesive, cabana, chair, table, cooler box, rake, hose reel, planter, hose nozzle, dining table, desk surface, furniture panel, kitchen cabinet, pin cap, or gas lighter. The resin composition of the present invention, because the composition possesses flowability, mechanical properties, and resistance to heat, cold, and impact, among the previously listed applications, the present invention is useful for automotive parts such as ignition bobbin, ignition case, clutch bobbin, sensor housing, idle speed control bulb, vacuum switching bulb, ECU housing, vacuum pump case and inhibitor switches. More particularly, the present invention is used for items that require good external appearance and mechanical properties such as lamp reflectors, air conditioning parts, and printer housing.

A further detailed explanation of the present invention is given by the following embodiments.

Abbreviations and details are shown below for the source materials used in the embodiments and comparative examples.

(A) Polybutylene Terephthalate Resin
A-1: polybutylene terephthalate resin (intrinsic viscosity 0.61 dl/g, COOH amount 23 eq/t)
A-2: polybutylene terephthalate resin (intrinsic viscosity 0.77 dl/g, COOH amount 12 eq/t)
A-3: polybutylene terephthalate resin (intrinsic viscosity 0.87 dl/g, COOH amount 15 eq/t)
A-4: polybutylene terephthalate resin (intrinsic viscosity 1.06 dl/g, COOH amount 30 eq/t)
A-5: polybutylene terephthalate resin (intrinsic viscosity 01.12 dl/g, COOH amount 26 eq/t)
A-6: polybutylene terephthalate resin (intrinsic viscosity 1.22 dl/g, COOH amount 42 eq/t)
(B) Polyethylene Terephthalate Resin
B-1: polyethylene terephthalate resin (intrinsic viscosity 0.65 dl/g)
(C) Nigrosine Dye
C-1: Nubian Black TH-827 (Solvent Black 7, melting point 275° C., Orient Chemical Industries)
C-2: Nubian Black NH-805 (Solvent Black 5, melting point greater than 300° C., Orient Chemical Industries)
(D) Glass Fibers
D-1: ECS03T-120 (Nippon Electric Glass)

In addition, the evaluation method for the inventive examples and comparative experiments is shown below.

Using a digital variable angle haze meter (Suga Experimental Equipment "UGV-D"), and based on JISK 7105, a 60° specular gloss (%) was measured for one surface of the experimental piece.

Examples 1-11

Resin compositions are obtained as shown in Table 1, and along with the (A), (B), and (C) components, all of the additional additives were supplied from the breech-loading part of the biaxial extruder of screw diameter 40 mmϕ and having supplied the (D) component from the secondary injection inlet between the principal injection inlet and the extruder tip, melting and mixing was performed with a cylinder temperature of 260° C.

After cooling within a cool bath the strand obtained from the dice, a pellet was made with a strand cutter. For each of the obtained pellets, after drying them for 3 hours or more with a hot air dryer at 130° C., an experimental piece shaped as a flat angle with the dimensions 60 mm×60 mm×2 mm thick was prepared using a molder with the cylinder temperature measured at 265° C. An evaluation of the gloss level of the experimental piece was performed. The results are shown in Table 1. Moreover, all of the units of the blending amounts of the (A), (B), (C), and (D) components in Table 1 are parts by weight.

From the results of Embodiments 1, 2 and 3, it is understood that by setting the carboxyl terminal group of the (A) component to 25 (eq/t) or less and having the solid viscosity of the (A) component to a range of 0.60-0.90, the gloss level of the obtained mold was 70% or more and a mold with superior appearance could be obtained.

From the results of Embodiments 4, 5, 6 and 7, by blending the (A) component to a range of 55-86 wt. % and the (B) component to a range of 14-45 wt. % with respect to 100 wt. % of a total weight of the (A) component and the (B) component, the gloss level of the obtained mold was 70% or more and a mold with superior appearance could be obtained.

From the results of Embodiments 8, 9, 10, and 11, by blending the (C) component in the range of 0.1 to 1.5 wt. with respect to 100 wt. by parts of a total weight of the (A) component and the (B) component, the gloss level of the mold was 70% or more and a mold with superior appearance could be obtained.

TABLE 1

|  |  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Polybutylene terephthalate | A-1 | 67 | 0 | 0 | 86 | 76 | 55 | 61 | 67 | 67 | 67 | 67 |
|  | A-2 | 0 | 67 | 0 | 0 | 0 | 0 | 0 | 0 | 0 | 0 | 0 |
|  | A-3 | 0 | 0 | 67 | 0 | 0 | 0 | 0 | 0 | 0 | 0 | 0 |
|  | A-4 | 0 | 0 | 0 | 0 | 0 | 0 | 0 | 0 | 0 | 0 | 0 |
|  | A-5 | 0 | 0 | 0 | 0 | 0 | 0 | 0 | 0 | 0 | 0 | 0 |
|  | A-6 | 0 | 0 | 0 | 0 | 0 | 0 | 0 | 0 | 0 | 0 | 0 |
| Polyethylene terephthlatae | B-1 | 33 | 33 | 33 | 14 | 22 | 45 | 39 | 33 | 33 | 33 | 33 |
| Nigrosine dye | C-1 | 0.7 | 0.7 | 0.7 | 0.7 | 0.7 | 0.7 | 0.7 | 0.1 | 0.4 | 1.2 | 1.4 |
|  | C-2 | 0.0 | 0.0 | 0.0 | 0.0 | 0.0 | 0.0 | 0.0 | 0.0 | 0.0 | 0.0 | 0.0 |
| Glass fibers | D-1 | 43 | 43 | 43 | 43 | 43 | 43 | 43 | 43 | 43 | 43 | 43 |
| Gloss level |  | 79% | 72% | 74% | 72% | 73% | 73% | 75% | 75% | 76% | 76% | 73% |

Comparative Examples 1-8

Instead of changing the composition of the resin composition as shown in Table 2, melting and mixing were performed in the same way as in Embodiment 1.

Continuing, pellets were made in the same way as in Embodiment 1, an experimental piece having a square plate shape was formed, and the gloss level was evaluated. The results are recorded in Table 2. Moreover, all of the units of the blending amount of the (A), (B), (C), and (D) components in Table 2 are parts by weight.

From the results of Comparative Examples 1 and 2, if the (A) component was outside the range of 55-86 wt. % and the (B) component was outside the range of 14-45% with respect to 100 wt. % of a total weight of the (A) component and the (B) component, the gloss level of the obtained mold was 60% or less, and the appearance deteriorated.

From the results of Comparative Example 3, if the melting point of the (C) component was 300° C. or more, the gloss level of the obtained mold was 60% or less, and the appearance deteriorated.

From the results of Comparative Examples 4, 5 and 6, if the range of the carboxyl terminal of the (A) component was not 25 (eq/t) or less and the range of the solid viscosity of the (A) component was not 0.60-0.90, the gloss level of the obtained mold was 60% or less, and the appearance deteriorated.

TABLE 2

|  |  | Comparative Example 1 | Comparative Example 2 | Comparative Example 3 | Comparative Example 4 | Comparative Example 5 | Comparative Example 6 | Comparative Example 7 | Comparative Example 8 |
| --- | --- | --- | --- | --- | --- | --- | --- | --- | --- |
| Polybutylene terephthalate | A-1 | 93 | 48 | 67 | 0 | 0 | 0 | 93 | 93 |
|  | A-2 | 0 | 0 | 0 | 0 | 0 | 0 | 0 | 0 |
|  | A-3 | 0 | 0 | 0 | 0 | 0 | 0 | 0 | 0 |
|  | A-4 | 0 | 0 | 0 | 67 | 0 | 0 | 0 | 0 |
|  | A-5 | 0 | 0 | 0 | 0 | 67 | 0 | 0 | 0 |
|  | A-6 | 0 | 0 | 0 | 0 | 0 | 67 | 0 | 0 |
| Polyethylene terephthlatae | B-1 | 7 | 52 | 33 | 33 | 33 | 33 | 7 | 7 |
| Nigrosine dye | C-1 | 0.7 | 0.7 | 0.0 | 0.7 | 0.7 | 0.7 | 0.0 | 2.2 |
|  | C-2 | 0.0 | 0.0 | 0.7 | 0.0 | 0.0 | 0.0 | 0.0 | 0.0 |
| Glass fibers | D-1 | 43 | 43 | 43 | 43 | 43 | 43 | 43 | 43 |
| Gloss level |  | 59% | 59% | 59% | 59% | 59% | 58% | 58% | 59% |

What is claimed is:

1. A thermoplastic polyester resin composition comprising: (A) polybutylene terephthalate resin, (B) polyethylene terephthalate resin, (C) nigrosine dye, and (D) glass fibers, said (A)-(D) having blending amounts of:
   (A) in the range of 55-86 wt. % based on 100 wt. % of a total of (A) and (B);
   (B) in the range of 14-45 wt. % based on 100 wt. % of a total of (A) and (B); and
   (C) in the range of 0.1-1.5 parts by weight based on 100 parts of a total of (A) and (B),
   wherein the carboxy terminal groups of (A) is at most 25 (eq/t),
   the intrinsic viscosity of (A) is in the range of 0.60-0.90, and
   the melting point of (C) is less than 300° C.

2. A molded article comprising the thermoplastic polyester resin composition according to claim 1.

3. The thermoplastic polyester resin composition according to claim 1, wherein the solid viscosity of (A) is 0.6-0.70.

4. The thermoplastic polyester resin composition according to claim 1, wherein the carbon terminal groups of (A) is 15-25 e/t.

5. The thermoplastic polyester resin composition according to claim 1, wherein the blending amount for (A) is 61-76 wt. %, and the blending amount for (B) is 22-39 wt. %.

6. The thermoplastic polyester resin composition according to claim 1, wherein the blending amount for (B) is 22-39 wt. %.

7. The thermoplastic polyester resin composition according to claim 1, wherein the blending amount for (C) is 0.4-1.2 parts by weight.

8. The thermoplastic polyester resin composition according to claim 1, wherein the blending amount for (D) is 35-50 parts by weight.

9. The thermoplastic polyester resin composition according to claim 1, wherein:
   the blending amount for (A) is 61-76 wt. %;
   the blending amount for (B) is 22-39 wt. %;
   the blending amount for (C) is 0.4-1.2 parts by weight; and
   the blending amount for (D) is 35-50 parts by weight.

10. The thermoplastic polyester resin composition according to claim 9, wherein:
    the solid viscosity of (A) is 0.6-0.70; and
    the carbon terminal groups of (A) is 15-25 e/t.

11. A molded article comprising the thermoplastic polyester resin composition according to claim 10.

* * * * *